Dec. 2, 1969　　　　　L. G. DORSETT　　　　　3,481,052
AURAL/VISUAL INFORMATION SYSTEM
Filed Oct. 9, 1967　　　　　　　　　　　　4 Sheets-Sheet 1
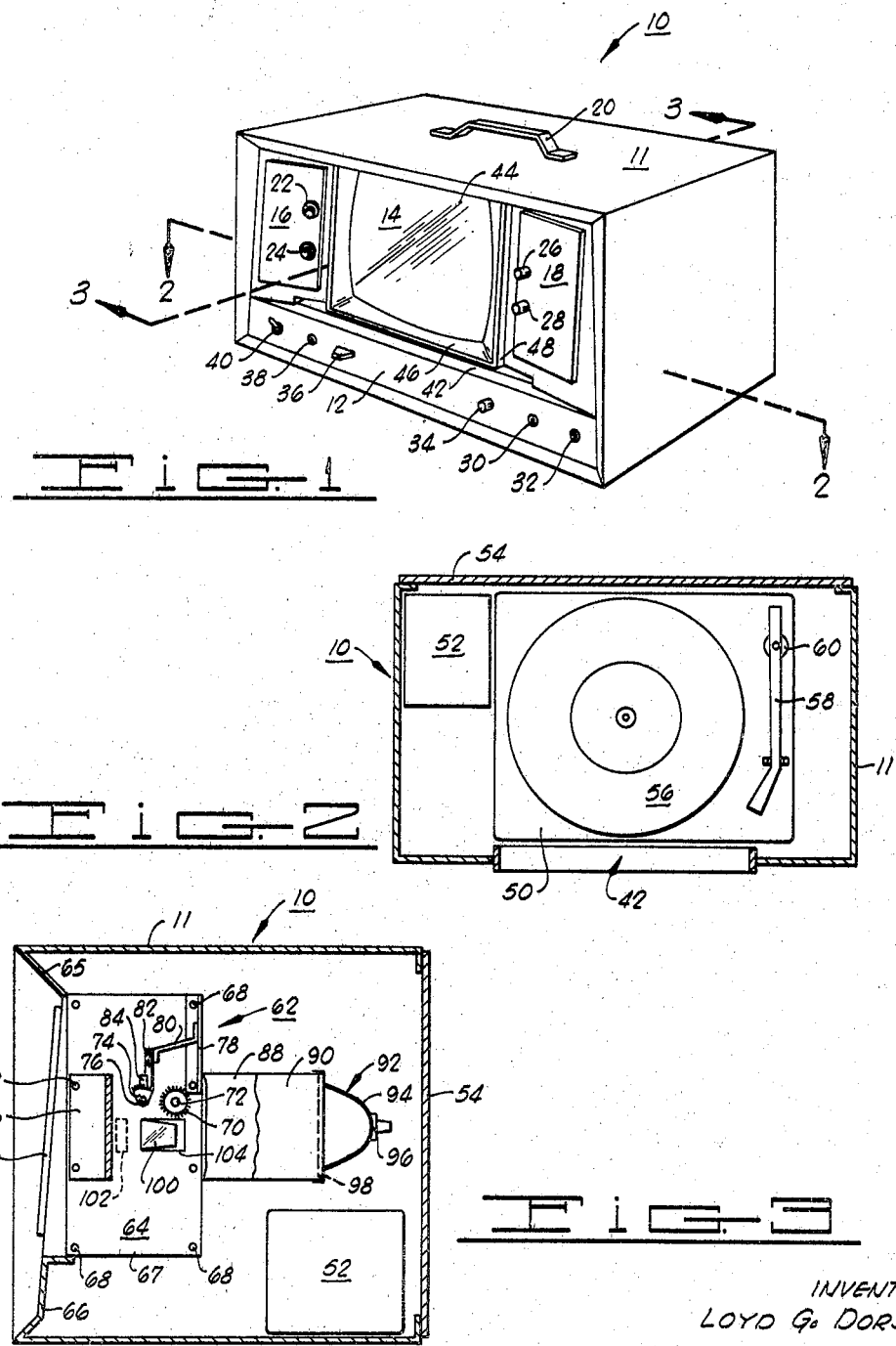
INVENTOR
LOYD G. DORSETT
BY
ATTORNEYS Dec. 2, 1969   L. G. DORSETT   3,481,052
AURAL/VISUAL INFORMATION SYSTEM
Filed Oct. 9, 1967   4 Sheets-Sheet 2
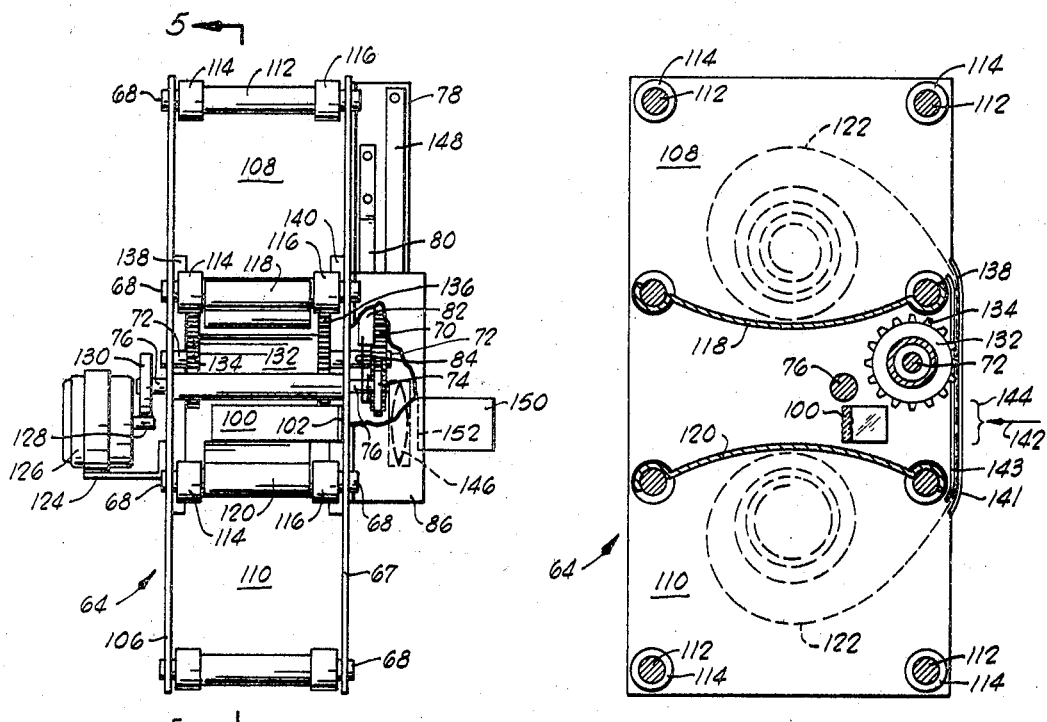
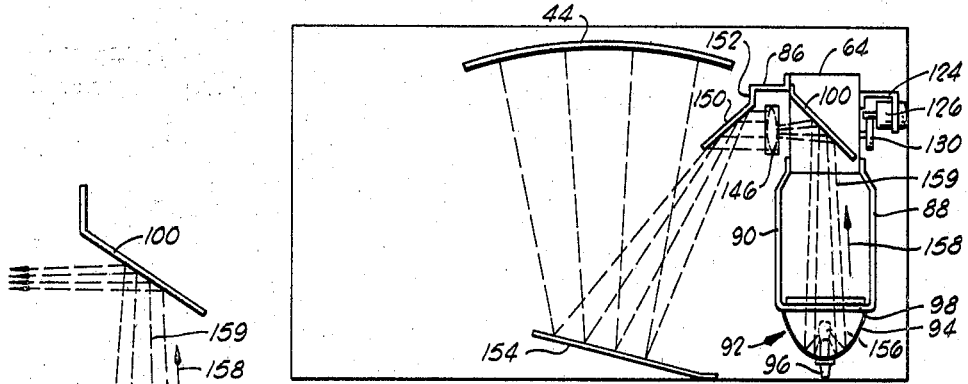
INVENTOR
LOYD G. DORSETT
BY
ATTORNEYS

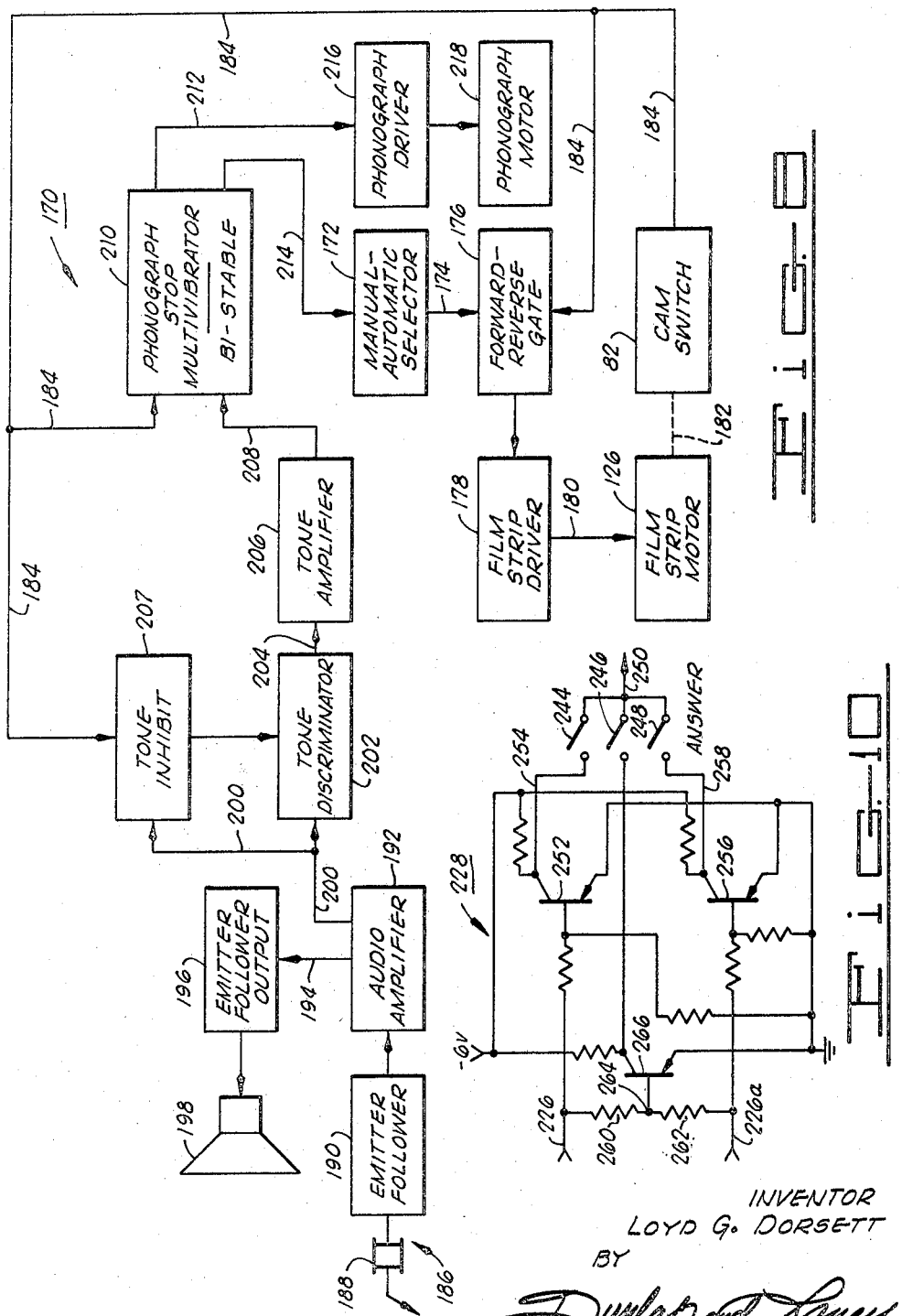

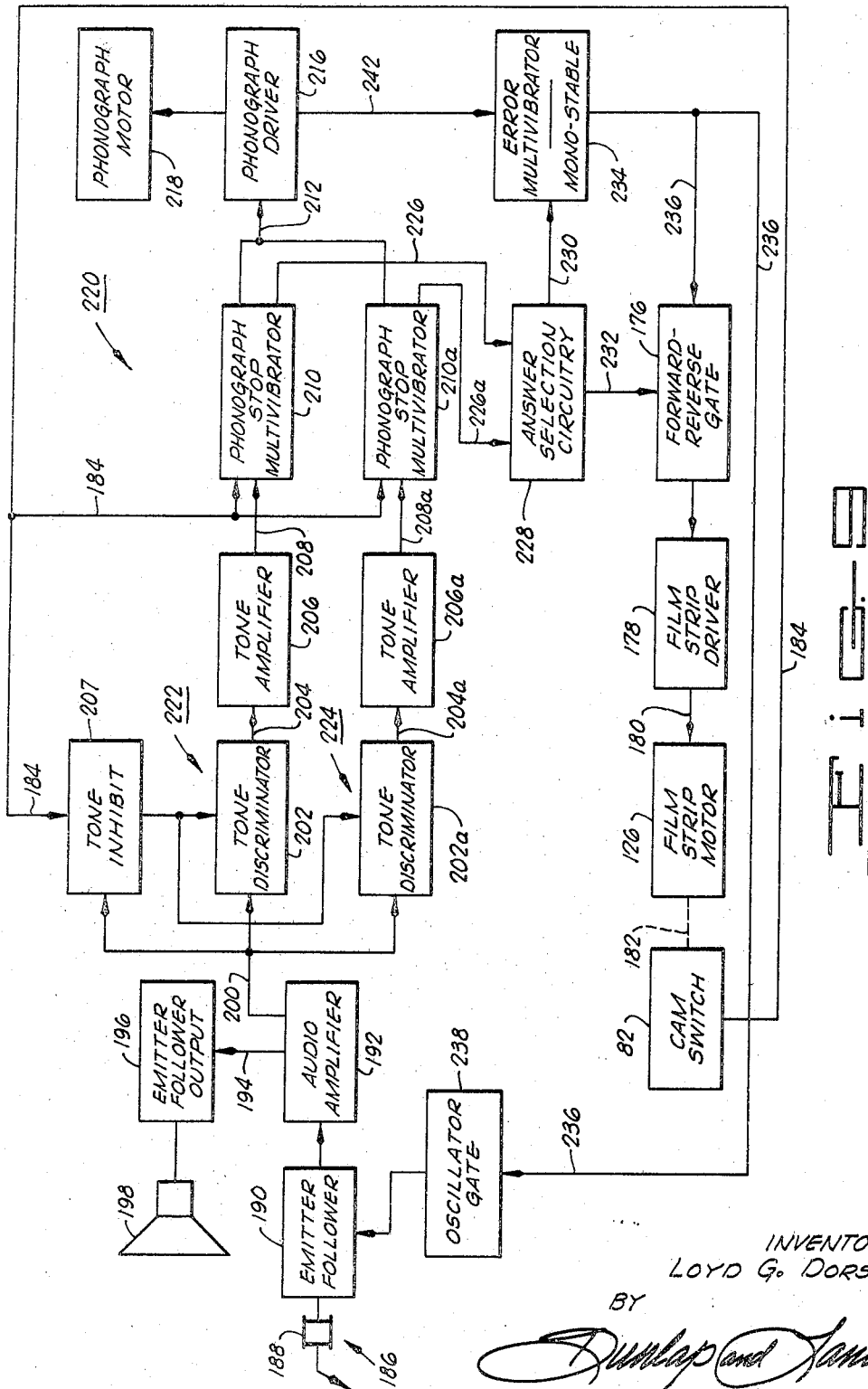

United States Patent Office 3,481,052
Patented Dec. 2, 1969

3,481,052
AURAL/VISUAL INFORMATION SYSTEM
Loyd G. Dorsett, Norman, Okla., assignor to Dorsett Industries, Inc., Norman, Okla., a corporation of Oklahoma
Continuation-in-part of application Ser. No. 461,789, June 7, 1965. This application Oct. 9, 1967, Ser. No. 673,676
Int. Cl. G09b 1/00; G03b 21/28
U.S. Cl. 35—8
12 Claims

ABSTRACT OF THE DISCLOSURE

Apparatus for presenting visual and/or aural information to an attending subject or subjects, the apparatus consisting of a compact film viewing assembly which receives a standard film strip and indexes through the frames to present the visual material as illuminated by a light projection device which places the visual material on the rear side of a front viewing screen. The system also includes a record playing mechanism for reproducing certain audio records which may include superimposed control tones, the tones affording interactive control between the audio playback and the indexing of visual material and, in this regard, answer circuitry may be included to provide indexing control and certain branching of the aural and visual information.

CROSS-REFERENCE TO RELATED APPLICATION

This is a continuation-in-part application of copending application, Ser. No. 461,789 entitled "Audio-Visual Teaching Machine," filed on June 7, 1965, now Patent No. 3,376,657, as well as a related application with respect to another copending application, Ser. No. 700,112, entitled "Method and Apparatus for Response Discrimination," filed Jan. 24, 1968, in the name of the same inventor.

BACKGROUND OF THE INVENTION

Field of the invention

The invention relates generally to recorded information presentation systems and, more particularly, but not by way of limitation, it relates to improved audio/visual presentation apparatus which is capable of diverse applications including teaching and testing.

Description of the prior art

The prior art includes many types of information presentation devices, teaching machines and related devices and these may utilize any of a number of different types of audio presentation and/or visual information presentation. Thus, various methods of individual student pacing and reinforcement are carried out with various combinations of recording and storage techniques, some of the recently proposed methods even require cooperative association with extensive computer installations. Generally speaking, the prior art systems are characterized by expensive construction and the requirement of lesson materials, i.e. audio and visual recordings, which are expensive to compose, modify and update. Prior work work in the field has also tended to place little emphasis on compactness and portability, such attributes being deemed secondary to the obtaining of more extensive and intricate teaching and control functions.

SUMMARY OF THE INVENTION

The present invention contemplates an information presentation system which is capable of presenting aural information, visual information, or a combination of the two forms of information with or without synchronous control and answering capability. In a more limited aspect, the invention consists of a housing member which includes a frame means for receiving film strip and indexing successive picture frames through a film guide where each is projected by a plurality of reflecting and focusing elements on to the rear side of a front viewing screen which is mounted in and forms a portion of the front panel of the housing member. Also, located centrally within the housing member, there is a record transport for receiving audio records through the front panel and playing back audio information which may include control tones, i.e. tone signals which serve to synchronize the aural and visual playback. The control means provides versatile control of the information system in that it can provide playback of either aural or visual material, synchronized playback of aural and visual material in response to programmed control tones, or presentation of the aural and visual material under the control of answer response and evaluating circuitry.

Therefore, it is an object of the present invention to provide a compact, low-cost aural and visual information presentation device which is relatively simple to load and control, and which is extremely reliable in operation.

It is also an object of the invention to provide a device which is capable of presenting visual information with vivid brightness and contrast from a rear-projecting optical system having very low power requirements.

It is a further object of the invention to provide an audio/visual information presentation system which can be operated with or without subject answer functions and which can be entirely portable and operated from an internally contained D-C battery source.

Finally, it is an object of the present invention to provide a novel film strip indexing and optical projection assembly of a type which is easily started and controlled and which lends itself particularly to lightweight, compact storage retrieval systems.

Other objects and advantages of the invention will be evident from the following detailed description when read in conjunction with the accompanying drawings which illustrate the invention.

BRIEF DESCRIPTION OF THE DRAWINGS

FIG. 1 is a perspective view of the housing assembly and front panel of the information system;

FIG. 2 is a top viewing section taken through plane 2—2 of FIG. 1;

FIG. 3 is a side viewing section taken through plane 3—3 of FIG. 1 to show the film indexing and optical projection components in greater detail;

FIG. 4 is an enlarged front view of the film indexing assembly of the invention;

FIG. 5 is a sectional view taken along lines 5—5 of FIG. 4;

FIG. 6 is a top view of selected parts of the housing assembly showing the optical projection components;

FIG. 7 is an alternative form of condensing light source which may be employed with the optical projection system shown in FIG. 6;

FIG. 8 is a block diagram of control circuitry which may be employed for synchronizing the audio playback and film strip indexing;

FIG. 9 is an alternative form of control circuitry which may be employed to provide teaching machine capability through answer selection; and FIG. 10 is a schematic diagram of answer selection circuitry which may be employed with the control circuitry of FIG. 9.

DESCRIPTION OF ONE EMBODIMENT

Referring to the drawings in greater detail, FIG. 1 illustrates an information presentation device 10 consisting of an outer case 11 having a front panel 12. The front panel 12 includes a viewing screen 14 and left and right side panels 16 and 18, left side panel 16 being hinged to provide operational access to the film projection assembly as will be further described.

The outer case 11 has a suitable handle 20 affixed thereon, and the front panel 12 provides various controls in a readily accessible position. Thus, the left side panel 16, which is also the film access door, includes a picture framing adjustment 22 and a focus adjustment 24. The right side panel 18 includes an audio volume control 26 and an operational mode switch 28. The audio speaker (not specifically shown) may be mounted just behind the right side panel 18; however, this is a design choice and the placement of the speaker is merely a matter of convenience. Also included on front panel 12 are a pair of ear phone jacks 30 and 32, a push button switch 34 for "film strip advance," a push button switch 36 for "film strip forward-reverse," a remote control jack 38, and an on-off toggle switch 40.

A horizontal slot 42 is formed through the front panel 12 to provide an access opening for insertion and removal of audio records. The viewing screen 14 consists of an arcuately shaped, translucent projection panel 44 which is both supported and decorated by an escutheon 46 formed therearound. A rectangular mounting frame 48 provides support for the escutcheon 46 and translucent panel 44, and it is connected by hinges (not shown) on the left hand side so that it can be swung open to provide access to the audio playback assembly within outer case 11.

The FIG. 2 section shows an audio playback assembly 50 mounted within the other case 11 and immediately behind the record access slot 42. Also shown is an area 52 that provides space for storage batteries which may be employed to supply all power to the unit. A removable back panel 54 provides closure and dust protection across the rear of outer case 11. The audio playback assembly 50 may be a conventional type of equipment which includes a turntable 56 and tonearm 58 mounted thereon in balanced relationship atop a suitable swivel mount 60. It should be understood that there are various types of audio playback mechanism which may be employed to fulfill the audio reproduction function in the present invention.

FIG. 3 shows a section through the left side of information presentation device 10, a section which shows a side-view of a film projection assembly 62 to good advantage. Thus, a frame 64 is secured immediately behind the left side door or panel 16 by means of suitable brackets 65 and 66 which may be formed as bends of the outer case 11. The frame 64 provides a support for film strip drive means as will be described below. Thus, a view of side plate 67 of frame 64 shows a gear 70 rotating a shaft 72. The gear 70 receives drive rotation from a sector gear 74 are rotated by a drive shaft 76. A bracket 78 is secured to the upper edge of frame 64 to extend an extension bracket 80 and switch 82 into actuating proximity with a cam extension 84. Cam extension 84 is securely mounted to drive shaft 76 to rotate therewith to provide a periodic opening of switch 82 upon each revolution of shaft 76 and, therefore, of section drive gear 74. Another bracket 86 is mounted at a forward edge of frame 64, bracket 86 serving as a mirror support and control shaft support (from panel controls 22 and 24) as will be further described.

A pair of side brackets 88 and 90 are attached to opposite rear edges of frame 64 and extend posteriorally to support the illumination source 92, i.e. a reflector 94 and bulb socket 96. The side brackets 88 and 90 may be connected by a cross member 98 which receives the illumination source 92 therethrough in secure positioning. Light from illuminating source 92 is directed through a selected film picture frame, as will be further described, and into frame 64 whereupon it is reflected by internal mirror 100 at about a 90° angle. The angularly disposed mirror 100 is secured to the inside of frame 64 by means of a foot member 102 formed integral therewith, and mirror 100 reflects light out through a rectangular opening 104 for further focusing and reflection to the back side of viewing screen 14.

Referring now to FIG. 4, the frame 64 is shown as being comprised of a side plate 67 and an opposite or left side plate 106 held together in secured spaced relationship by a plurality of rectangularly arrayed axle members 68 secured therebetween. The axles 68, eight such members in all, are spaced into rectangular arrays to define an upper enclosure 108, for storing film strip, and a lower enclosure 110, for receiving film strip after projection. Thus, each of axles 68 includes a central spacer portion 112 of slightly larger diameter, and left and right side rollers 114 and 116, respectively, which serve to support the film strip in freely movable manner in each of the upper enclosure 108 and lower enclosure 110. A pair of arcuate film guides, upper guide 118 and lower guide 120, are disposed between more central and adjacent pairs of axle spacers 112 to provide support and separation between the two ends of the film strip, shown as dashed line 122 in FIG. 5.

A bracket 124 is situated in secure engagement on the left side panel 106 to support a motor 126 in a secure, driving position. The film strip drive motor 126 may be one of the various commercially available types of D-C motor which are recommended for low voltage D-C operation. Rotational output from motor 126 is present on output shaft 128 and the motion is transmitted through frictional engagement to friction disc 130 which is secured to the drive shaft 76. The rotary drive is then transmitted across frame 64 to the sector drive gear 74 and then to gear 70 and shaft 72 to a sprocket gear 132. The sprocket gear 132 may be a conventional film advance gear having a row of sprockets 134 and 136 around each side. Thus, as presently constructed, the sprocket gear 132 is adapted for thirty-five millimeter film strip such that 16 equi-spaced sprockets are disposed around each side of sprocket gear 132.

FIG. 5 shows the sprocket gear 132 to better advantage and it also shows its disposition with respect to the film strip traverse path, drive shaft 76 and internal reflector mirror 100 which is disposed within the mechanism of frame assembly 64. Referring also to FIG. 4, a pair of film guides 138 and 140 are secured by suitable fasteners to the rearward edge of respective side plates 106 and 67. The sectional view of FIG. 5 shows the film guide 138 as being comprised of a pair of parallel edge guides 141 and 143 which are each slightly curved inwardly at both top and bottom. The opposite film guide 140 would be similarly constructed. Thus, the film strip 122 can be manually inserted within the top entry openings of film guides 138 and 140 and moved slightly downward until the film sprocket holes come into engagement with the sprockets 134 and 136 of sprocket wheel 132. The machine is then loaded for projection operation.

Projection light from the illumination source 92 will enter frame 64 along a direction indicated generally by arrow 142. Thus, illumination of a picture frame of film strip 122 will take place in the area indicated by bracket 144, and the modulated light will then be reflected from internal mirror or reflector 100 out through the side hole 104 (FIG. 3) of the frame 64. Referring to FIG. 4, light emerging from frame 64 will be directed toward a lens 146 which is held by a bracket 148, also secured to the side brackets 78. The bracket 148 is movable sideways under control of front panel knob 24 to provide focus adjustment of the image and this light is then reflected from an angularly oriented reflector 150 toward the rear of presentation device 10. The reflector 150 is actually formed integral with the bracket 86 as supported in spaced relation by a flanged portion 152.

FIG. 6 illustrates the optical components and projection path of the system including a rear reflector 154 which is affixed to rear panel 54. Thus, frame 64 extends the opposite side support brackets 88 and 90 rearward to support the illumination system 92, a condensing reflector 94 and illumination light bulb 156. The reflector 94 is formed in an ellipsodial shape, i.e. one end portion of a selected elliptical body of revolution, and the light bulb 156 is positioned at one of its foci. This combination of light source and condensing reflector is designed so that a majority of the total light output of light bulb 156 will be directed in a generally converging pattern along the path 158 toward the film strip. The light rays converge at a point 159, the opposite elliptical focus, and the optical spacing is adjusted so that point 159 falls in the entrance pupil for lens 146. Such projection optics design allows that a very low wattage light bulb be employed, one which is consonant with restrictions imposed by a portable D-C battery power supply while still affording a relatively bright image for the viewer.

FIG. 7 shows an alternative form of illumination source 92 which enables a similar function of providing a very high degree of total light output for projection through a selected frame of film strip such that a greater percentage of the total light is utilized in forming the final image on the front viewing screen 14. Thus, the light bulb 156 may be positioned at a focal point of a parabolic reflector 160 which provides a high percentage of the total light along a slightly diverging path 162. This light may then be redirected by a condensing lens 164 such that the majority of light rays are converged along path 158 to a focus at point 159 which lies in the entrance pupil to the focusing lens 146. The optical operation here is highly similar to that of FIG. 6 except that it requires an additional optical unit, the condensing lens 164, to fulfill the desired function. Even with the additional inexactness introduced by lens 164, the parabolic light source of FIG. 7 still has extremely good capability for providing a relatively bright final image with but small illumination input.

The block diagram of FIG. 8 shows various electronic circuitry which is included in the information presentation system 10 and which is capable of providing any of several operations, e.g., manually controlled film viewing, audio record controlled film viewing, etc. It should be understood that the various individual circuit stages called for in the block diagrams of FIGS. 8 and 9 may be made up of generally conventional forms of circuitry, the particular combination and interaction of such circuitry being previously described in the aforementioned copending patent application, Ser. No. 461,789.

The control circuitry 170 can be operated either manually or automatically by manipulation of selector 172. Thus, in a manual position, the operator's manipulation would provide an output via line 174 through a forward-reverse gate 176 to energize film strip driver 178. The film strip driver 178, a conventional transistor motor drive circuit which applies direct current via lead 180 to the film strip drive motor 126. The cam switch 82 (see also FIG. 3) is energized by a mechanical linkage 182 (drive shaft 76 etc. of FIG. 4) to provide a switch actuation output on lead 184. The signal on lead 184 is applied to forward-reverse gate 176 such that drive power is removed from film strip motor 126 and, at the same time, it places a short circuit across motor 126 to bring it to a stop more quickly by well-known dynamic braking action. The gate circuitry 176 may also include a manual forward-reverse switch which can be operated to move the film strip as desired.

An audio record can be played in accompaniment to the visual playback. Thus, audio reproduction can take place through a playback head 186, here shown as a phonograph cartridge 188, and the output signal is applied through an emitter follower stage 190 for input to a conventional audio amplifier 192. The output of audio amplifier 192 is then applied via a first output lead 194 to an emitter follower stage 196 to energize an audible output speaker 198. Other equivalent audio reproducer such as earphones, remote speakers, etc. may be employed as a matter of choice. It should be understood too that the emitter follower stages and the audio amplifier 192 represent conventional forms of transistorized circuitry which is well-known in the art.

There are still other uses of the circuitry 170, for example, for playing back a recorded audio portion of information which record also contains synchronizing control tones or constant frequency tone bursts which may be employed for coordinating the advance of related visual material present on a film strip. In the case, the audio record will contain successive lengths of audio information and each of such lengths will usually terminate with a control tone signal which denotes film strip advance.

Here then the audio amplifier 192 will provide audio information output through emitter follower output 196 and speaker 198 and, in addition, an output 200 from audio amplifier 192 is applied to a tone discriminator 202. The tone discriminator 202 may be a conventional frequency selector network capable of conducting only the control tone signal through its output 204 to a tone amplifier 206. One type of discriminator circuit which is suitable for use as tone descriminator 202 is a dual transistor, sharply tuned, twin-T active filter circuit, such circuit being disclosed in the aforementioned U.S. Patent application Ser. No. 461,789. The control tone signal may be selected to be at any convenient frequency, as also stated in the above application, a 250 cycles per second signal has been used to good advantage. A tone inhibit circuit 207 is employed to block output from tone discriminator 202 except when properly required. That is, as may be the case for an excessively long control tone, after the tone actuation has taken place the tone inhibit prevents further actuation by the same control tone on the record startup for the next operation. Thus, tone inhibit circuit 207 acts as an AND gate circuit such that an input on lead 184 from cam switch 82, coupled with an input on lead 200 from audio amplifier 192 will disable tone discriminator 202 to prevent further tone actuation output on lead 204.

A valid tone or control signal output from tone amplifier 206 through lead 208 will actuate a phonograph stop multivibrator 210 to its other stable state to provide control output signals on leads 212 and 214. The first output on lead 212 cuts off conduction in the phonograph driver 216 and this, in turn, ceases operation of the phonograph motor 218. Thus, a control tone signal has occurred and phonograph motor 218 is stopped such that no further audio information is played back. The second output on lead 214 from stop multivibrator 120 is applied to control the manual-automatic selector 172 (i.e., in the automatic mode of operation) such that proper control of the film strip motor 126 is exercised. Thus, occurrence of control tone signal places output on lead 214 from stop multivibrator 210 through the manual-automatic selector 172 and forward-reverse gate circuitry 176 to enargize the film strip drive 178 and film strip motor 126 to advance the film strip.

The advance of the film strip is only until the next picture frame of the film strip is in proper view due to the fact that the sector drive gear 74 (FIG. 3) and cam switch 82 maintain such cycling actuation. That is, sector drive gear 74 (FIG. 3) makes one revolution and in so doing rotates sprocket gear 70 sufficient to frame the next picture frame in the film aperture of the projection optics. Thereupon, the synchronously rotating cam 84 actuates cam switch 82 to provide control output on lead 184 to disable the phonograph stop multivibrator 210, to de-energize film strip drive 178, and to cease operation of film strip motor 126 with dynamic braking or reverse current flow.

OPERATION

The operation as described hereafter is with respect to the total facility operation, or that operation which utilizes all components in concert; however, it should be kept in mind that the information distribution system 10 and its attendant control circuitry 170 provide additional operational modes which may be selected at will. Thus, the information distribution system 10 may be used as a film strip projector, successive frames being shown with intermittent advancement of frames. Or, an audio record may be played in accompaniment to a showing of visual material by the film strip projection components. Still further, and as the following description will set forth, the audio and visual components of information can be simultaneously disseminated with coordinated control.

Referring to FIG. 1, a selected audio record including periodic control tone signals may be inserted through the slot way 42 for placement onto the turn table 56. The rectangular door frame 48 including viewing panel 44 is hinged and may be opened outwardly to allow access to the interior of outer case 11 and the proper placement of tone arm 58 to initiate audio output.

The left side panel 16, also a hinged door panel, can then be opened to allow the loading of selected visual material. As shown in FIG. 5, a film strip 122 can be loaded by inserting its leading edge into the upper openings of oppositely disposed film guides 138 and 140 (FIG. 4) and then manually advancing the film slightly until the film sprocket holes engage the sprockets 134 and 136 of sprocket gear 132. The remainder of the film strip 122 can be allowed to coil, seeking its own disposition, in the upper enclosure 108 and resting on the arcuate film guide 118. As the film is periodically advanced the used frames will also seek a coiled disposition in lower enclosure 110.

Coordination of the first film picture frame and a first length of audio information on the phonograph record is effected due to the manner in which the equipment is set up for operation. Thereafter, a control tone signal which is included on the phonograph record is employed to periodically advance the successive picture frames contained on film strip 122. It should be understood that such tone coding or control actuation is merely one choice, and that other modes of control may be utilized such as photo-optical coding contained on the film strip 122, as well as other conventional forms of recorded control indications.

Referring to FIG. 8, audio information is played back through the audio pickup 188 whereupon it is amplified and conducted through emitter follower output 196 for audible presentation through the speaker 198 or parallel earphones, not specifically shown. At the end of a unit or length of audio information, a control tone signal is reproduced and this is amplified on lead 200 through tone discriminator circuitry 202 and tone amplifier 206 for actuation of the bi-stable multivibrator 210. Multivibrator 210 is then switched to an opposite conductive state which ceases the conduction through phonograph driver 216 and the phonograph motor 218. A counterpart output on lead 214 from the multivibrator 210 is applied to a manual-automatic selector 172 which, in its automatic setting, actuates forward-reverse gate 176 to control film strip driver 178 such that film strip motor 126 advances the film strip to bring the next following picture frame into the viewing aperture of the film strip projection apparatus 62.

As may be noted in FIGS. 3 and 4, the film strip drive motor 126 provides its rotational output through a friction disc 130 to a sector drive gear 74, and this sector gearing arrangement contributes to the assurance that single, properly framed picture frames will advance. Thus, actuation of motor 126 revolves sector gear 74 counter-clockwise such that it engages the gear 70 and rotates it through a preset angle, and sprocket gear 132 is similarly rotated to advance the film strip 122 by exactly one picture frame. Upon continuing its counter-clockwise revolution, the sector drive gear 74 returns to its null position whereupon the coordinated cam extension 84 actuates cam switch 82. The cam switch 82 then serves to disallow control actuation upon further reproduction of control tone signal when next starting up the phonograph record, and it also provides an energizing input up to the stop multivibrator 210 to once again place it in the conduction state in which output lead 212 energizes phonograph driver 216 and phonograph motor 218 rotates to produce audio output. The opening of cam switch 82 is also utilized to control forward-reverse gate 176 such that dynamic braking or reverse-current actuation of film strip motor 126 is effected.

The manual-automatic selector 172 can also be utilized to actuate certain other spontaneous functions since it actually represents a group of front panel controls. For example, and referring to FIG. 1, a spring switch 36 energizes film strip driver 178 and film strip motor 126 to manually advance or back up film frames. This switch is especially useful for rewinding a film strip after projection. An additional push button switch 34 is provided to actuate a single picture frame advancement when desired.

Front panel film strip adjustments are made through the knobs 22 and 24 through the left side access panel 16. Thus, the upper knob 22 may connect to a shaft (not shown) which can be depressed to place a friction disc in engaging relationship with gear 70 such that it can be rotated to rotate sprocket gear 132 and to frame the particular picture in view. Once picture framing is set for a film strip it remains constant and proper throughout the remaining projection. The lower knob 24 provides focus control over the system output. Knob 24 may be affixed to a shaft which leads back into a cam engagement with a side surface of lens bracket 148. Rotation of knob 24 will then move the lens 146 laterally into proper, light focusing relationship.

The optical system employs unique optical components which allow a relatively bright picture projection on the viewing screen 44 while using only a small-wattage, flashlight-type bulb 156 as the light source. This is accomplished by employing an ellipsoidal light reflector 94 around the source or bulb 156 with bulb 156 placed at one of the foci, the remaining or opposite focus point falling near the film gate aperture in the plane of the entrance pupil to the projection lens 146. After the light passes through the film or picture frame aperture, area 144 between film guides 138 and 140 of FIG. 5, and before entering the projection lens 146, a vertical 45° mirror 100 reflects the light out through an aperture 104 (see FIG. 3) through the focusing or projection lens 146.

Light rays emerging from lens 146 are again reflected by a 45° mirror 150 toward the rear of the outer case 11, and the rays are then reflected from rear mirror 154 forward toward the rear side of the translucent projection panel 44. The placement of light bulb 156 at the focus of the ellipsoidal condensing reflector 194 assures that nearly all of the light rays, or at least a very desirable large percentage, will be either directed or reflected toward the opposite elliptical focus point, and the physical placement of projection lens 146 such that its entrance pupil includes this focus point in its plane assures the maximum utilization of illumination from the light source.

AN ALTERNATIVE EMBODIMENT

FIG. 9 illustrates alternative control circuitry 220 which enables answering capability such that the information system 10 becomes a teaching device. The inforation system 220 includes many stages similar to system 170 of FIG. 8 and these are identified by like numerals. An information system 10 functioning with the control circuitry 220 utilizes a phonograph record having two different constant frequency tone signals recorded thereon in predetermined relationship to the audio subject matter as well as to one another. Thus, the dual control tones may be utilized to provide a code indicative of certain limited answer requirements.

The pickup head 188 plays back audio information as well as either of the control tone signals when they occur and this reproduced audio is conducted through an emitter follower 190 for amplification in audio amplifier 192. The audio amplifier 192 provides an output 194 through emitter follower output 196 for reproducing the audio signals through loud speaker 198 or such. An output 200 from audio amplifier 192 provides inputs to each of the pair of separate, parallel control tone channels 222 and 224 as well as to the tone inhibit circuit 207.

The control tone channel 222 may be similar to that of the FIG. 8 circuitry such that it includes a tone discriminator 202 which conducts a control tone signal of a first predetermined frequency $f_1$ and provides an output on lead 204 through tone amplifier 206 and its output lead 208 to actuate a phonograph stop multivibrator 210. The control tone channel 224 is a similar, parallel circuit except that it is designed to accept a different frequency of control tone signal. Thus, tone discriminator 202a will accept a second control signal at frequency $f_2$ within a second predetermined frequency range to provide an output via lead 204a for amplification in a tone amplifier 206a. The amplified output on lead 208a will then activate a phonograph stop multivibrator 210a. A first output 212 taken in parallel from each of the phonograph stop vibrators 210 and 210a is applied for input to phonograph driver 216 to control the phonograph motor 218. Second outputs 226 and 226a are applied as inputs to answer selection circuitry 228.

There are various forms of circuitry which may be included as the answer selection circuitry 228. These might include various forms of written, oral-spoken, or typewritten input devices capable of providing an error output on lead 230 and/or a correct response output on lead 232. A correct response on lead 232 may be applied to the forward-reverse gate 176 so that it controls film strip driver 178 to energize film strip motor 126 for forward advancement of the film strip to a next following picture frame. The cam switch 82 may be utilized in the same manner as previously described providing a preset output on lead 184. The output on lead 184 is applied to reset inputs at each of the photograph stop multivibrators 210 and 210a, this reset occurring after the multivibrators have fulfilled their stop function, if required. The cam output on lead 184 is also applied as an enabling input to the tone inhibit AND gate 206.

An incorrect response output from answer selection citrcuitry 230 is applied to actuate an error multivibrator 234 to initiate various error functions. The error multivibrator 234 is a mono-stable type of multivibrator and, upon actuation, it generates an error output on a lead 236. The error output on lead 236 is applied to forward-reverse gate 176 to disable the circuit such that film strip driver 178 is not energized and no film traverse takes place. The error output on lead 236 is also applied to enable an oscillator gate 238 which conducts a reinforcement alarm through input 240 to the emitter follower 190. Thus, an alarm tone, e.g. a raucous buzzer tone is conducted through the amplifier circuitry and reproduced in the loud speaker 198 to indicate that a wrong answer has been made to a query or requirement. An output 242 is derived from phonograph driver 216 to enable the error multivibrator 234 only when the phonograph motor is deenergized.

FIG. 10 shows a simplified form of answer selection circuitry 228 which is suitable for use with the two-tone coding system employed with the control circuitry 220 of FIG. 9. Thus, the answer selection circuitry 228 is capable of giving multiple answers by the manual closure of one or more answer switches 244, 246 and 248 to provide an answer output on lead 250 (leads 230 and 232 of FIG. 9). An input of either one of two or both control actuations on input leads 226 and 226a may be utilized to place certain actuating voltage values at the answer switches 244, 246 and 248. That is, in response to various detected tones, answer switch 244 responds to a detected tone input at lead 226, answer switch 248 responds to a detected tone input at lead 226a, and answer switch 246 responds to a summation of detected zone inputs on each of leads 226 and 226a. Thus, the two control tones enable at least three answer possibilities.

The answer selection circuitry 228 is constructed with conventional PNP-type transistor circuitry as is well-known in the logic art. Thus, lead 226 is applied as an input to the base of a PNP-type transistor 252, its collector being connected to the minus six (−6) volt supply and its emitter being connected directly to ground, with output taken from the collector on lead 254 for application to the first answer switch 244. Similarly, a detected control input on lead 226a is applied to the base of an PNP-type transistor 256, energized in parallel in the same manner as transistor 252, and a collector output is then taken via lead 258 for connection to the answer switch 248. A third answer capability is enabled by combining detected control tone input signals from each of leads 226 and 226a. That is, leads 226 and 226a are connected through respective voltage dropping resistors 260 and 262 to a junction 264 which is connected to the base of a third PNP-type transistor 266. The resistors 260 and 262 are of equal value which will drop the input voltage by an amount sufficient to disable transistor 266 or maintain it nonconductive except when both of leads 226 and 226a carry signals for additive input. Transistor 226 is similarly connected in emitter-grounded configuration and an output is taken from the collector to the remaining answer switch 246.

The operation of the information system 10 when used as a teaching or testing device is the same as that previously described except for the additional response control functions. Thus, the phonograph record or film strip may include spoken or printed queries or instructions which can be carried out by a student or subject in attendance, and the answer selection circuitry 228 provides a student response mechanism. The answer requirements may be conveyed through the tone coding of the audio record or, in some cases, such answer coding may be carried out by photoelectric coding placed on the film strip material.

In the present case, answer coding is done by placing either one or both control tone signals on the phonograph record at a selected point, e.g. after a unit or length of audio information has been played and logical sequence requires a student answer. The two separate control tones can be employed to require a multiple choice answer in response to either the first control tone, the second control tone, or the sum of first and second control tones. When a correct answer or response is made, the answer circuitry 228 initiates energization of film strip driver 178 and motor 126 to advance the film strip one frame. When an incorrect response is made, answer circuitry 228 actuates error multivibrator 234 which, in turn, prevents film strip advance and registers an audible error tone though oscillator gate 238.

The foregoing sets forth a novel audio/visual device which is capable of various modes of operation ranging from entertainment usage to more serious teaching and testing procedures. The machine may be employed merely as an improved facility for reproduction of recorded audio and/or visual information. As such, the machine constitutes a reliable device of relatively inexpensive cost which is capable of clear and complete information reproduction with low power input requirements. The device has the further capability of accepting answer input functions such that it becomes a very effective teaching machine. Here again, the low cost, low power requirement features enable a teaching machine which is reliable and versatile of operation, and which can utilize the more-or-less conventional or existing forms of teaching records.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. An information presentation system, comprising:
   a continuous length of coiled film having a series of picture frames;
   frame means including upper and lower generally rectangular enclosures which support opposite coiled end portions of said length of film;
   first and second arcuate film guide means forming lower and upper walls of said respective upper and lower generally rectangular enclosures, said arcuate film guide means contacting and supporting said opposite coiled end portions of the length of film;
   film guide means affixed to said frame means between said upper and lower enclosures for supporting a selected picture frame of said films;
   sprocket means affixed to said frame means and being disposed adjacent said said film guide means and in engagement with said film;
   a light source;
   a light reflector surrounding said light source to the extent that a majority of light rays from said light source are directed in a converging beam through said film guide means to said frame means;
   a first reflector means affixed to said frame means between said upper and lower enclosures for directing said converging beam of light from said film guide means out of said frame means;
   a viewing screen;
   lens means adjustably secured external to said frame means and receiving said beam of light from said first reflector means within said frame means and focusing said beam on the rear side of said viewing screen;
   drive means affixed to said frame means adjacent said film guide means and providing intermittent rotational output to said sprocket means; and
   control means for energizing said drive means.

2. An information presentation system as set forth in claim 1 which is further characterized to include:
   an audio record including sequential segments of audible information, said audio record including control tone of predetermined, constant frequency intersticed between said segments of audible information;
   audio playback means for reproducing said audible information and control tone as a playback signal;
   tone discrimination means energized by said playback signal to provide an output control tone signal;
   audio output means energized by said playback signal to provide audible output presentation; and
   tone control means energized by said output control tone signal to actuate said control means to energize said drive means.

3. An information presentation system as set forth in claim 2 wherein said control means is further characterized to include:
   means energized by said control tone signal for de-energizing said audio playback means; and
   switch means actuatable to re-energize said audio playback means whereupon a next portion of audio and visual information is presented.

4. An information presentation system as set forth in claim 2 wherein said light reflector comprises:
   an end portion of an elliptical body of revolution which receives said light source positioned at its elliptical focus point.

5. An information presentation system as set forth in claim 3 wherein said light reflector comprises:
   an end portion of an elliptical body of revoltuion having said light source positioned at its elliptical focus point.

6. An information presentation system as set forth in claim 3 which is further characterized to include:
   second reflector means receiving said light from said lens means and redirecting said light along paths which are substantially normal to the rear side of said viewing screen.

7. An information presentation system as set forth in claim 1 wherein said drive means comprises:
   motor means providing constant speed rotational output;
   sector drive gear means receiving said rotational output;
   gear means including an axial drive shaft connected to said sprocket means, said gear means being meshed with said sector drive gear means through a portion of its rotation such that intermittent movement of said sprocket means is effected.

8. An information presentation system as set forth in claim 3 wherein said drive means comprises:
   motor means providing constant speed rotational output;
   sector drive gear means receiving said rotational output;
   gear means including an axial drive shaft connected to said sprocket means, said gear means being meshed with said sector drive gear means through a portion of its rotation such that intermittent movement of said sprocket is effected.

9. An information presentation system as set forth in claim 3 which is further characterized to include:
   cam means affixed to said drive means to receive said intermittent rotational output in coordination with said sprocket means;
   cam switch means disposed proximate said cam means to be periodically actuated closed at a predetermined point of revolution of said cam means to disable energization of said drive means.

10. An information presentation system as set forth in claim 3 which is further characterized to include:
    answering means for registering a selected one of plural indications;
    a second control tone recorded on said audio record and having a constant frequency different from said control tone, said second control tone also being played back by said audio playback means within said playback signal;
    second tone discrimination means energized by said playback signal to generate a code control signal in response to presence of said second control tone with said playback signal; and
    answer control means enabled by said code control signal to provide an energizing output to actuate said switch means to re-energize said audio playback means in response to a selected one of the plural indications from said answering means.

11. An information presentation system as set forth in claim 10 wherein said answering means and answer control means comprise:
    first input means for receiving said control tone signal;
    second input means for receiving said code control signal;
    first reactance means connected to said first input means and being rendered conductive in response to input of said control tone signal;

second reactance means connected to both of said first and second inputs and being rendered conductive in response to input of both said control tone and code control signals;

third reactance means connected to said second input means and being rendered conductive in response to input of said code control signal;

first answer switch means which can be closed to provide said energizing output to actuate said switch means when said first reactance means is conductive;

second answer switch means which can be closed to provide an energizing output to actuate said switch means when said second reactance means is conductive; and third answer switch means which can be closed to provide an energizing output to acuate said switch means when said third reactance means is conductive.

12. An information presentation system as set forth in claim 3 which is further characterized to include:

answering means for registering a selected one of plural indications;

a code indication recorded on a small portion of the picture frame of said continuous length of film;

means for reading out said code indication to generate a code control signal; and answer control means enabled by said code control signal to provide an energizing output to actuate said means in response to a selected one of the plural switch means to re-energize said audio playback indications from said answering means.

References Cited

UNITED STATES PATENTS

| | | |
|---|---|---|
| 2,783,454 | 2/1957 | North. |
| 2,787,669 | 4/1957 | Flan et al. |
| 2,985,069 | 5/1961 | Sampson _____ 35—8 |
| 3,103,073 | 9/1963 | Nickl et al. _____ 35—9 |
| 3,141,243 | 7/1964 | Chapman et al. _____ 35—9 |
| 3,277,588 | 10/1966 | Lynott et al. _____ 35—9 |
| 3,355,818 | 12/1967 | Whitehorn _____ 35—9 |
| 3,305,942 | 2/1967 | Mast et al. _____ 35—9 |

FOREIGN PATENTS 763,341 12/1956 Great Britain.

OTHER REFERENCES

Projectionist, vol. 25:12, pp. 24 and 25, December 1950.

EUGENE R. CAPOZIO, Primary Examiner

W. W. NIELSEN, Assistant Examiner

U.S. Cl. X.R.

353—77

PO-1050
(5/69)

UNITED STATES PATENT OFFICE
CERTIFICATE OF CORRECTION

Patent No. 3,481,052             Dated December 2, 1969

Inventor(s) Loyd G. Dorsett

It is certified that error appears in the above-identified patent and that said Letters Patent are hereby corrected as shown below:

In Column 6, line 70 "enargize" should be --energize--.

Column 14, lines 2 and 3 interchanged.

SIGNED AND
SEALED
AUG 25 1970

(SEAL)
Attest:

Edward M. Fletcher, Jr.
Attesting Officer

WILLIAM E. SCHUYLER, JR.
Commissioner of Patents